United States Patent [19]

Morris

[11] Patent Number: 5,205,422
[45] Date of Patent: Apr. 27, 1993

[54] HOLDER FOR POWER ROTARY HANDSAWS

[76] Inventor: Kenneth D. Morris, Box 14, Group 25, RR 2 St. Anne, Manitoba, Canada, R0A 1R0

[21] Appl. No.: 899,718

[22] Filed: Jun. 17, 1992

[30] Foreign Application Priority Data

Jun. 20, 1991 [CA] Canada ................................. 2045097

[51] Int. Cl.⁵ .............................................. A47F 7/00
[52] U.S. Cl. ..................................... 211/70.6; 211/87
[58] Field of Search .......................... 211/87, 70.6, 13; 312/245; 248/176

[56] References Cited

U.S. PATENT DOCUMENTS

| 2,291,381 | 7/1942 | Drake | 211/70.6 X |
| 2,503,737 | 4/1950 | Hodgkins | 211/70.6 X |
| 3,285,426 | 11/1966 | Wilcke | 211/87 X |
| 3,285,427 | 11/1966 | Dando et al. | 211/70.6 |
| 4,365,720 | 12/1982 | Kaneshiro | 211/70.6 |
| 5,078,353 | 1/1992 | Linn | 211/70.6 X |

Primary Examiner—Robert W. Gibson, Jr.
Attorney, Agent, or Firm—Robert W. B. Bailey

[57] ABSTRACT

A rotary power tool holder, particularly a holder for rotary power handsaws, has a bottom wall including a longitudinal slot for the circular saw or tool element. A side wall parallel to the slot has a projection to engage the tool guard. This projection can be varied to accommodate different guards, its distance from and height above the slot can be varied to accommodate different rotary power saw models. The breadth of the slot can be altered to let the saw sit lower. The projection may be adjustable in height. Both bottom wall and side wall are attachable to substrates. Tool receiving recesses may be provided on the side wall away from the slot, which form sockets when the side wall is attached to a substrate.

20 Claims, 4 Drawing Sheets

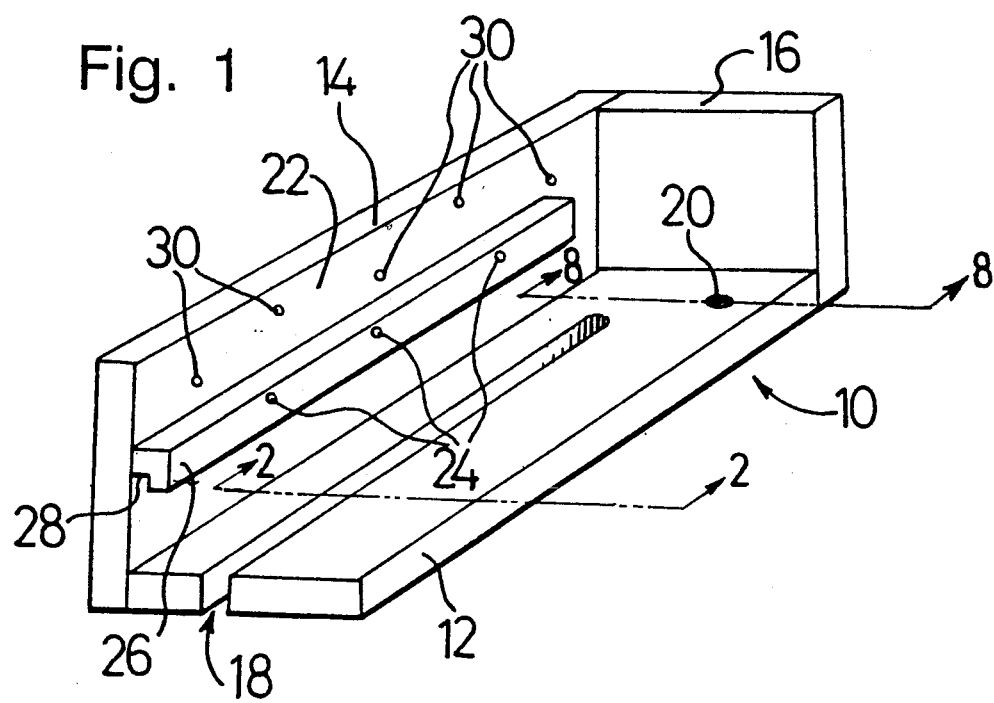
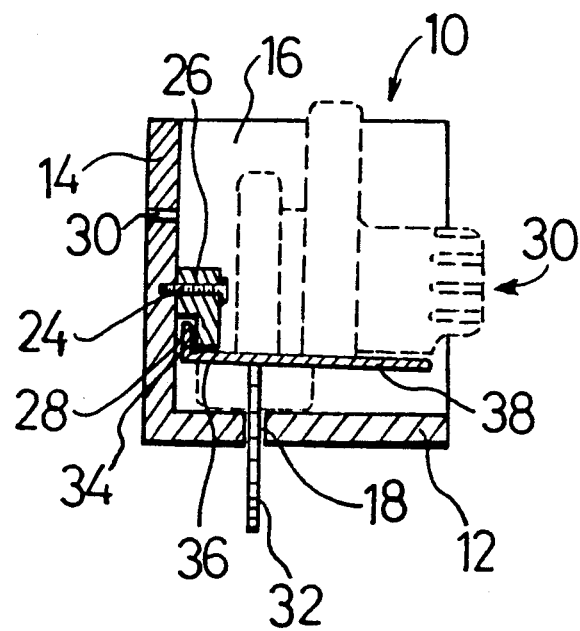
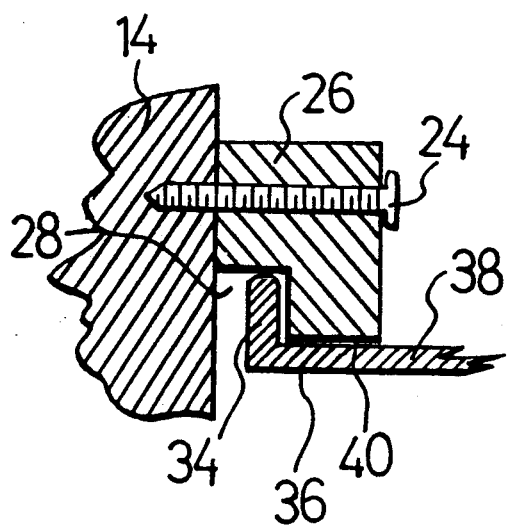

HOLDER FOR POWER ROTARY HANDSAWS

This invention relates to a holder for rotary power handsaws. At present no such device is available on the market. Rotary power handsaws include a plate mounting a motor driving a circular saw blade, which projects through or below the plate. A guard forms a continuation of the plate on the side of the saw opposite the motor. The novel holder accommodates blade and guard allowing the saw to be placed in the holder, which can be attached to a vertical or horizontal substrate, such as a wall, partition or workbench allowing the saw to be stored.

Although the invention will be described and referred to specifically as it relates to holders for rotary power tools it will be understood that the principles of this invention are equally applicable to similar holders and accordingly, it will be understood that the invention is not limited to such holders.

PRIOR ART AND BACKGROUND OF INVENTION

While applicant is aware of no prior art relating to the invention, there are rotary power handsaw guides known, but these relate entirely to devices used to guide the saw blade during a cutting operation, as in U.S. Pat. No. 3,263,714 to Martinson, U.S. Pat. No. 3,344,824 to Greco, U.S. Pat. No. 3,454,056 to Pahlck, and U.S. Pat. No. 4,545,121, to Armbruster et al.

As may be seen holders for rotary power handsaws are not commonly known in the art.

It is an object of the invention to provide a holder for rotary power handsaws and similar rotary power tools. A subsidiary object is to provide a holder for such power handsaws and tools, attachable to a substrate such as a wall, or partition, a workbench or similar working surface. Other objects will be apparent to those skilled in the art from the following specification, appended claims and accompanying drawings.

DESCRIPTION OF THE INVENTION

In one broad aspect the invention is directed to a holder for a rotary power tool, which tool includes rotary disc shaped tool means and guard means for the tool means. This holder comprises horizontally disposable base means with longitudinal slot means closed at a first end and open at a second end to accommodate the disc shaped tool means, together with upright means spaced apart from the slot means, extending upward from the base means. The upright means has horizontally projecting means to engage the guard means. The holder can be attached to a vertical substrate, such as a wall, work bench or building partition, by the upright means, when the upright means comprises attachment means allowing attachment to a vertical substrate. Similarly the holder can be attached to a horizontal substrate, typically a work bench or work surface, by the base means, when the base means comprises attachment means allowing attachment to a horizontal substrate. Conveniently both the upright means comprises attachment means allowing attachment to a vertical substrate, and the base means comprises attachment means allowing attachment to a horizontal substrate. The horizontally disposable base means may comprise bottom wall means having opposed first and second ends, opposed first and second sides, and opposed upper and lower surfaces, including longitudinal slot means (of the base means) spaced apart from and parallel to the first side extending from the first end toward the second end, to accommodate the disc shaped tool means. The upright means may comprise vertically disposable side wall means connected to and extending upward from the first side of the bottom wall means, the side wall means (of the upright means having projecting means to engage the guard means. Vertically disposable end wall means may connect the side wall means to the second end of the bottom wall means.

In another broad aspect the invention is directed to a holder for a rotary power tool, which includes rotary disc shaped tool means and guard means for the tool means. This holder comprises horizontally disposable bottom wall means, vertically disposable side wall means and vertically disposable end wall means. The bottom wall means has opposed first and second ends, opposed first and second sides, and opposed upper and lower surfaces. Longitudinal slot means spaced apart from and parallel to the first side extends from the first end toward the second end. The bottom wall means has cylindrical aperture means separate from the slot means connecting the upper and lower surfaces, which allows attachment of the holder to a horizontal substrate such as a work surface or work bench, by a bolt or similar fastening means. The vertically disposable side wall means is connected to and extends upward from the first side of the bottom wall means to an upper edge. The side wall means extends from the first end to the second end of the bottom wall means. The side wall means has inner and outer surfaces, the inner surface having continuous horizontally disposed inward projecting means spaced above the bottom wall means. The side wall means may have a plurality of cylindrical apertures connecting the inner and outer surfaces, which allows attachment of the holder to a vertical substrate, such as a wall, building partition or work bench, by screws, nails or similar fastening means. The end wall means connects the inner surface of the side wall means and the second end of the bottom wall means, this has been found advisable when the holder is constructed of wood or plywood to add strength to the holder. Those skilled in the art can routinely determine the necessity and advisability of an end wall means.

In another broad aspect the invention is directed to a holder for a rotary power tool, which includes rotary disc shaped tool means and guard means for the tool means. This holder comprises horizontally disposable bottom wall means, and vertically disposable side wall means. The bottom wall means has opposed first and second ends, opposed first and second sides, and opposed upper and lower surfaces. Longitudinal slot means spaced apart from and parallel to the first side extends from the first end toward the second end. The bottom wall means has cylindrical aperture means separate from the slot means connecting the upper and lower surfaces. The vertically disposable side wall means is connected to and extends upward from the first side of the bottom wall means to an upper edge. The side wall means extends from the first end to the second end of the bottom wall means. The side wall means has inner and outer surfaces, the inner surface having continuous horizontally disposed inward projecting means spaced above the bottom wall means. The side wall means may have a plurality of cylindrical apertures connecting the inner and outer surfaces.

The projecting means may comprise downward facing channel means adjacent the side wall means, which engages the tool guard when it has an upward outer flange. Another variation has the projecting means comprising downward facing horizontally disposable surface means, which engages the flat tool guard when it does not have an upward flange. A third variation has the projecting means additionally comprising vertically disposable surface means extending downward of the horizontally disposable surface means and inward of the side wall means, this engages both the end and the flat part of the tool guard. A fourth variation has the projecting means comprising downward facing groove means adjacent the side wall means and downward facing horizontally disposable surface means extending outward of the groove means, which engages a tool guard with an upward end flange by the groove, and the flat part by the downward facing surface. In a fifth variation the projecting means comprises strip angle means having adjoining vertically and horizontally disposable flange means, preferably the vertically disposable flange means has vertical slots to accomodate screws attaching the vertically disposable flange means to the side wall means. The side wall means may have recess means on the side opposed to the projecting means, the recess means having conformation to receive arbour wrench means, the recess means may also have conformation to receive rotary saw blade means. Conveniently both may be employed. When the side wall is attached to a substrate (wall or partition, for instance) the substrate forms another side to the recess forming a socket to receive saw blades, and arbour wrenches.

Those skilled in the art, can routinely determine the parameters and dimensions of projecting means, slot means and their horizontal and vertical distances, required for the rotary power tool and guard to fit easily into the holder.

In use the projection restrains upward movement of the guard, preventing the tool from tipping toward its motor.

Although the holder is primarily designed to hold rotary power handsaws, it will also hold rotary power tools of a similar nature, with disc shaped tool means and associated tool guards.

BRIEF DESCRIPTION OF THE DRAWINGS

Preferred embodiments are indicated in the drawings where:

FIG. 1 shows a perspective view of an embodiment of the invention;

FIG. 2 shows a transverse part sectional view of the embodiment of FIG. 1 in use;

FIG. 3 shows a detail of FIG. 2;

DESCRIPTION OF THE PREFERRED EMBODIMENTS

Figure 4:
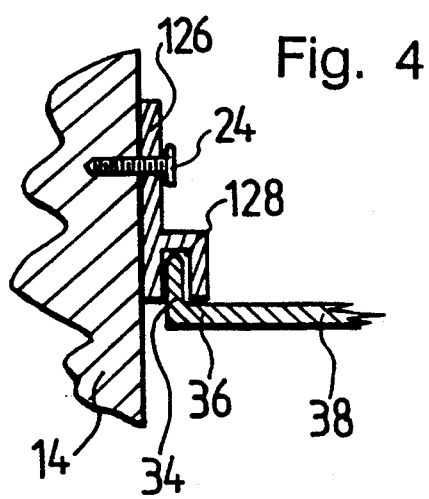
FIG. 4 shows an alternative detail to that of FIG. 3.

The general description of the invention is now expanded by reference to the drawings, which illustrate preferred embodiments of the invention.

The dimensions given below as those skilled in the art will be aware are for the purposes of illustration only, and not by way of restriction.

Numeral 10 generally indicates the holder of the invention. Holder 10 includes in one embodiment (FIG. 1) bottom wall 12, side wall 14 and end wall 16. Bottom wall 12 has a longitudinal slot 18 to accommodate a rotary saw blade, and optional cylindrical hole 20 to accommodate a bolt. Side wall 14 has attached to inner face 22 by wood screws 24, wooden block strip 26 having downward facing channel 28. The walls can be conveniently made of ⅜ inch plywood, which are glued, or nailed together. Bottom wall 12 is suitably 12 inch long by 3½ inch wide. Slot 18 is suitably 10 inch long at the top and 8½ inch at the bottom with a sloping end wall. Slot 18 is suitably either ⅜ inch or ½ inch wide, and 1 inch from inner face 22 of side wall 14. Hole 20, when present is ⅜ inch or 7/16 inch in diameter. Side wall 14 is suitably 3½ inch high and 12¾ inch long, it has several holes 30 drilled through it allowing attachment to a workbench, wall or the like, by suitable screws or nails (for example 1½ inch #8 screws), the inside of channel 28 is suitably about 7/16 inch above bottom wall 12, channel 28 suitably extends along side wall 14 to about the end of slot 18. These dimensions can be routinely varied according to circumstance as those skilled in the art will be aware.

In use as shown in FIGS. 2 and 3, rotary power saw 30 is placed in holder 10, so that saw blade 32 passes through slot 18, base plate, while upward flange 34 of guard 36 of base plate 38 engages channel 28. In one commonly available family of rotary power saws, guard 36 nearly always includes upward flange 34. Downward facing lower surface 40 of strip 26 engages base plate 38 at the same time as flange 34 engages channel 28. Channel 28 is suitably about ⅛ inch square in section, while strip 40 is about ½ inch square in section.

In FIG. 4 is shown an alternative form of engaging upward flange 34, wooden block strip 26 is replaced by metal strip 126 which has channel 128 to receive upward flange 34 of guard 36. The internal top of channel 128 is suitably 7/16 inch above bottom wall 12.

Figure 5:
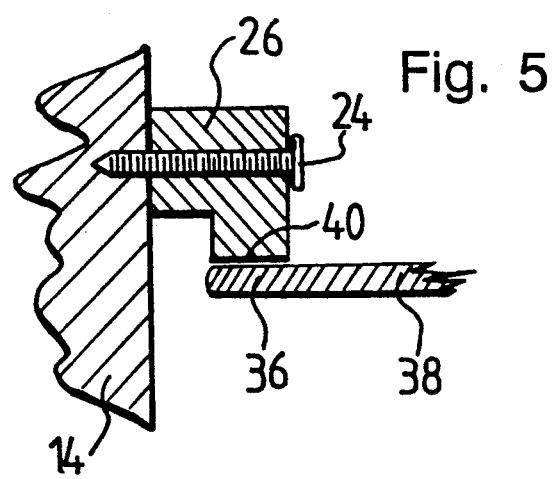
FIG. 5 shows the detail of FIG. 3, engaging a handsaw guard of different profile.
Figure 6:
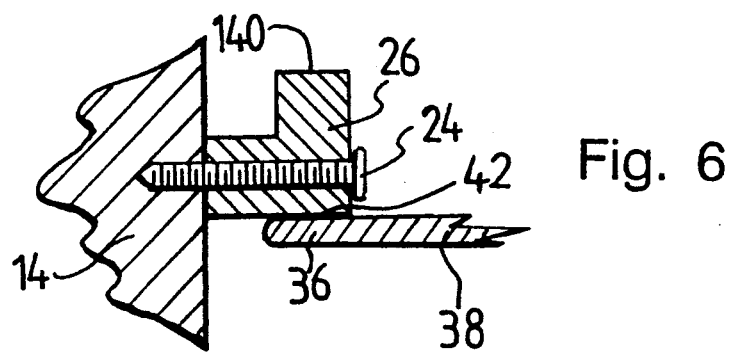
FIG. 6 shows a different arrangement of the detail of FIGS. 3 and 5.

In FIG. 5, guard 36 without a flange is shown engaging lower surface 40 of strip 26. An alternative configuration of strip 26 is shown in FIG. 6, where the strip is reversed so former lower surface 40 becomes upper surface 140, the former upper surface becoming lower surface 42, to engage guard 36.

Figure 7:
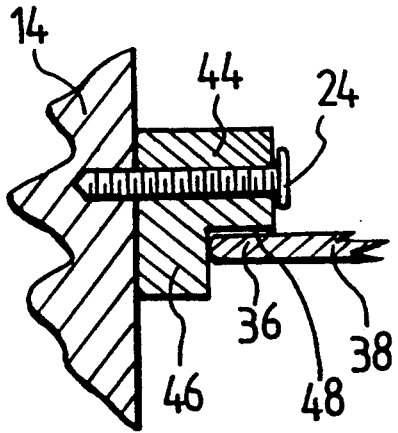
FIG. 7 shows an alternative detail of the invention to those of FIGS 3, 5 and 6.

In FIG. 7, strip 26 is replaced by wooden block strip 44, which has downward inner projection 46 which engages the end of guard 36 while lower surface 48 of strip 44 suitably engages base plate 38. Suitably strip 44 is about ½ inch square in section, while projection 46 is about ⅛ inch square in section.

Figure 8:
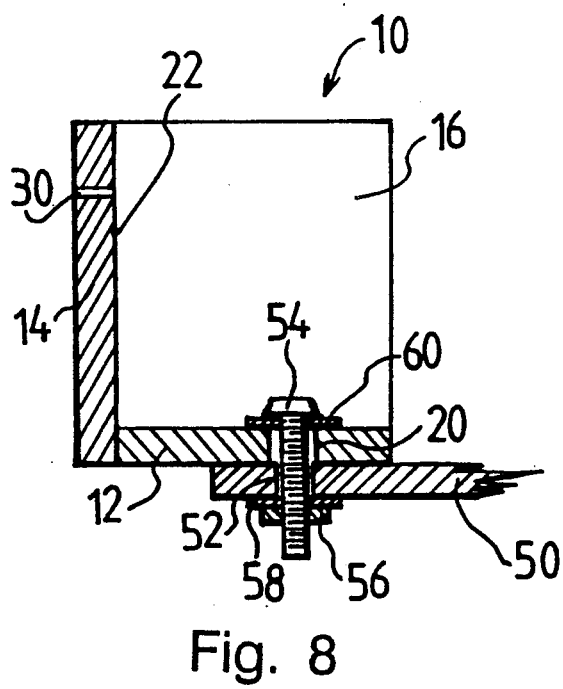
FIG. 8 shows a transverse sectional view of the embodiment of FIG. 1 as secured to a work bench.

In FIG. 8, is shown a mode of securing the holder of FIG. 1, to a work bench. Holder 10 is attached to work bench 50, which has therein hole 52. Bolt 54 is passed through hole 20 of bottom wall 12 of holder 10, and through hole 52 of work bench 50, and secured in position by nut 56. Preferably washers 58 and 60 are utilized to abut against bottom wall 12 and work bench 50. Work benches with such holes are in common use—particular those of the WORK MATE (trade mark of Black and Decker) type—as those skilled in the art are fully aware.

Figure 9:
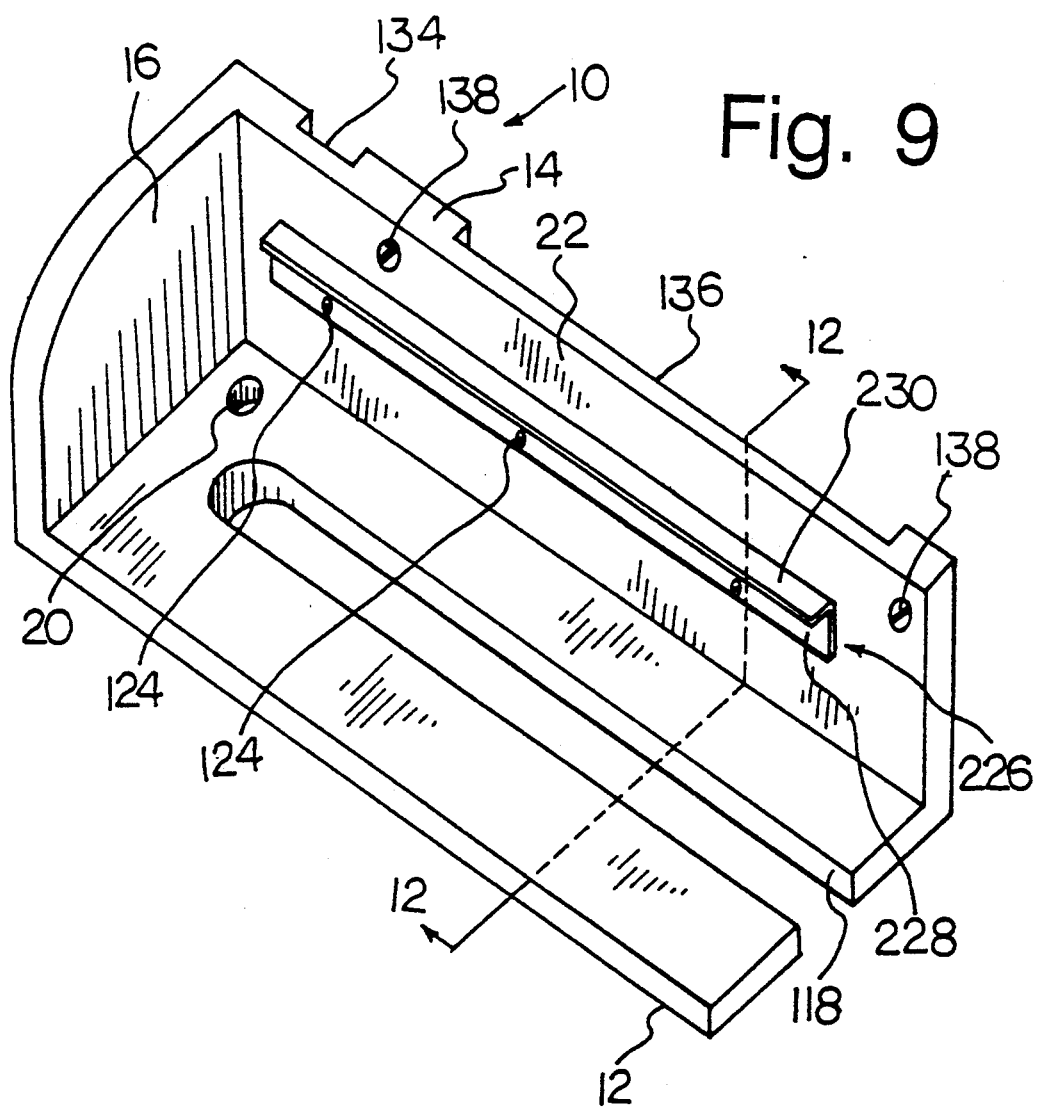
FIG. 9 shows a perspective view of a second embodiment of the invention.
Figure 10:
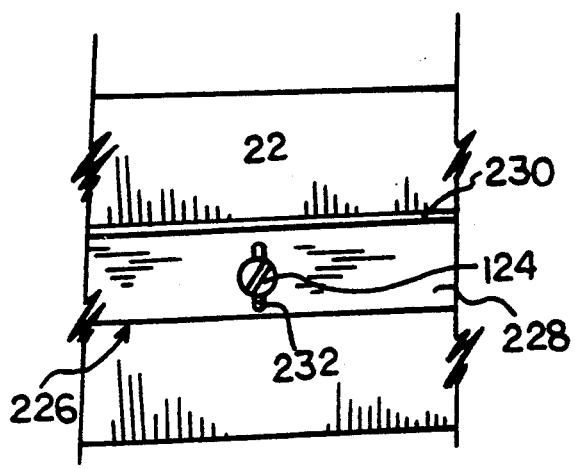
FIG. 10 shows a detail of the embodiment of FIG. 9.
Figure 11:
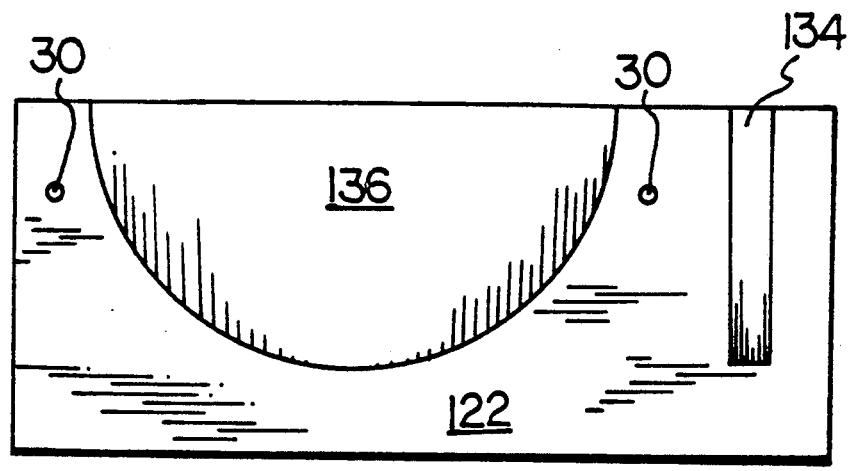
FIG. 11 shows a rear view of the embodiment of FIG. 9.
Figure 12:
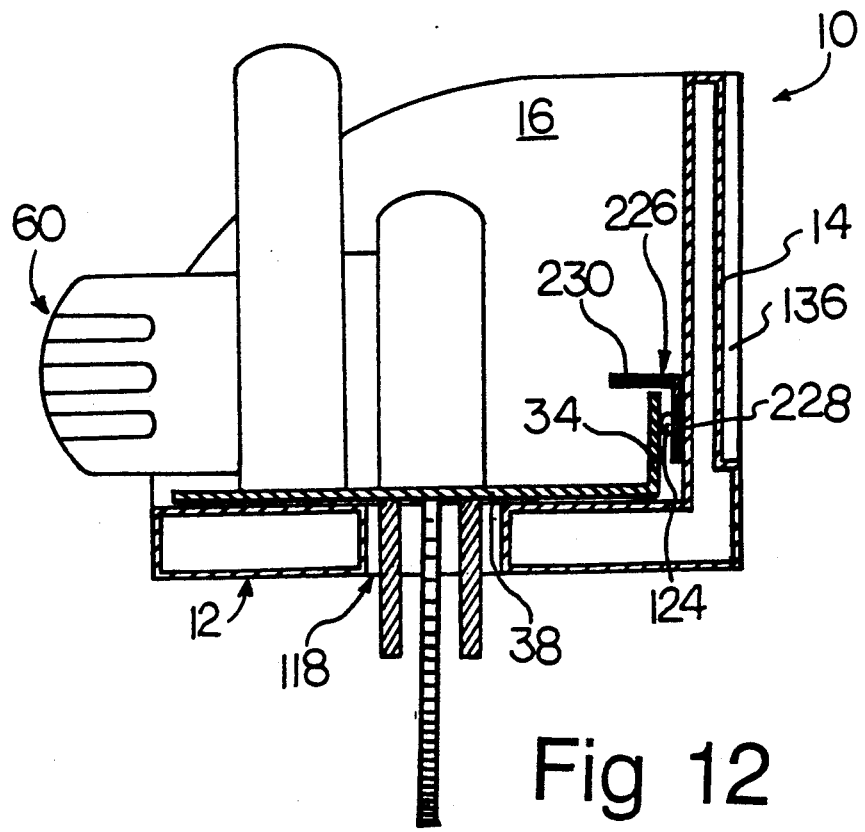
FIG. 12 shows a sectional view of the embodiment of FIG. 9 holding a saw.

In FIG. 9 is shown a second embodiment wherein numeral 10 generally indicates the holder of the invention. In this embodiment holder 10 includes bottom wall 12, side wall 14 and end wall 16. Bottom wall 12 has a longitudinal slot 118 to accommodate a rotary saw blade and its cover, and optional cylindrical hole 20 to accommodate a bolt. Side wall 14 has attached to inner face 22 by screws 124, angle strip 226, having downward flange 228 and outward flange 230 downward flange 228 has slots 232 allowing adjustment of the height of angle strip 226 and thus outward flange 230 (shown in FIG. 10). Conveniently recesses 134 and 136 (also shown in FIG. 11) are provided in the exterior surface 122 of wall 14, when the holder is fastened to a substrate for example screws 138 passing through wall 14 but not recesses 134 and 136, recess 134 accommodates an arbor wrench for removal and changing the saw blade, semicircular recess 136 accomodates saw blades up to 8½ inch diameter. In the blow moulded version shown holder 10 is blown to give an ⅛ inch or an 3/16 inch thick skin, which may be varied as those skilled in the art would realize. Upright walls 14 and 16 are conveniently ⅛ inch thick and 4½ inch high, while bottom wall 12 is conveniently 5½ inches wide, 13 inches long and ¾ inch thick, these dimensions may be varied as those skilled in the art would realize. Slot 118 is suitably about 11 inch long about 1½ inch wide with a semicircular inner end centered about 2½ inch from the inner edge of wall 16, and a center line about 2½ inch from inner face 22 of side wall 14. Hole 20, when present is ⅜ inch or 7/16 inch in diameter. Side wall 14 may have holes 30 drilled through it allowing attachment to a workbench, wall or the like, by suitable screws or nails (for example 1½ inch (38 mm) #8 screws), the inside of channel 28 is suitably about 7/16 inch (11 mm) above bottom wall 12. Angle strip 226 has ¾ inch flanges 228 and 230, 1/16 to ⅛ inch thick, these are plastic in this embodiment, and may extend 6 to 8 to 10 inches along inner wall surface 22. In FIG. 12 is shown saw 60 positioned within holder 10, its guard 38, resting on bottom wall 12, has upturned end flange 34, which engages strip flange 230. These dimensions can be routinely varied according to circumstance as those skilled in the art will be aware.

Although the first embodiment is described in terms of a wooden holder, and the second in terms of a blow moulded plastic holder the invention is not restricted thereto, as those skilled in the art would be aware, it can be manufactured from suitable conventional plastics and metals by suitable conventional techniques.

The strips to engage the sawguards are exemplified as wood or metal. As those skilled in the art would appreciate they may be made of wood, metal or plastic, by suitable conventional techniques.

As those skilled in the art would appreciate the dimensions of the holder can be adapted to fit various types of rotary power saw. The height of strips 26, 44, 126 and 226 can be adjusted by removing screws 24 and 124, drilling holes in wall 14 at a suitable height and replacing strips 26, 44, 126 and 226 at the new height. The dimensions of the slot and its distance from wall 12 can be changed to accommodate different rotary power saws. These dimensional changes can be routinely determined by those skilled in the art.

As those skilled in the art would realize these preferred illustrated dimensions, details and components can be subjected to substantial variation, modification, change, alteration, and substitution without affecting or modifying the function of the illustrated embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. A holder for a rotary power tool, said tool including rotary disc shaped tool means and guard means for said tool means, said holder comprising horizontally disposable base means including longitudinal slot means closed at a first end and open at a second end to accommodate said disc shaped tool means, and upright means spaced apart from said slot means, extending upward from said base means, said upright means having horizontally projecting means to engage said guard means.

2. A holder of claim 1, said upright means comprising attachment means allowing attachment to a vertical substrate.

3. A holder of claim 1, said base means comprising attachment means allowing attachment to a horizontal substrate.

4. A holder of claim 1, said upright means comprising attachment means allowing attachment to a vertical substrate, and said base means comprising attachment means allowing attachment to a horizontal substrate.

5. A holder of claim 1, wherein said horizontally disposable holder comprising horizontally disposable base means comprises bottom wall means having opposed first and second ends, opposed first and second sides, and opposed upper and lower surfaces, said bottom wall means including said longitudinal slot means spaced apart from and parallel to said first side extending from said first end toward said second end, to accommodate said disc shaped tool means, and
said upright means comprises vertically disposable side wall means connected to and extending upward from said first side of said bottom wall means, said side wall means including said projecting means to engage said guard means.

6. A holder of claim 5, wherein said projecting means comprises downward facing channel means adjacent said side wall means.

7. A holder of claim 5, wherein said projecting means comprises downward facing horizontally disposable surface means.

8. A holder of claim 7, wherein said projecting means additionally comprises vertically disposable surface means extending downward of said horizontally disposable surface means and inward of said side wall means.

9. A holder of claim 5, wherein said projecting means comprises downward facing groove means adjacent said side wall means and downward facing horizontally disposable surface means extending outward of said groove means.

10. A holder of claim 5, additionally comprising vertically disposable end wall means connecting said side wall means and said second end of said bottom wall means.

11. A holder of claim 5, wherein said projecting means comprises strip angle means having adjoining vertically and horizontally disposable flange means.

12. A holder of claim 11, wherein said vertically disposable flange means has vertical slots to accomodate screws attaching said vertically disposable flange means to said side wall means.

13. A holder of claim 12, wherein said side wall means has recess means on the side opposed to said projecting means, said recess means having conformation to receive arbour wrench means.

14. A holder of claim 12, wherein said side wall means has recess means on the side opposed to said projecting means, said recess means having conformation to receive rotary saw blade means.

15. A holder for a rotary power tool,
said tool including rotary disc shaped tool means and guard means for said tool means,
said holder comprising horizontally disposable bottom wall means, vertically disposable side wall means and vertically disposable end wall means,
said bottom wall means having opposed first and second ends, opposed first and second sides, and opposed upper and lower surfaces, including longitudinal slot means spaced apart from and parallel to said first side extending from said first end toward said second end, said bottom wall means having cylindrical aperture means separate from said slot means connecting said upper and lower surfaces,
said vertically disposable side wall means connected to and extending upward from said first side of said bottom wall means to an upper edge, said side wall means extending from said first end to said second end of said bottom wall means, said side wall means having inner and outer surfaces, said inner surface having continuous horizontally disposed inward projecting means spaced above said bottom wall means,
said end wall means connecting said inner surface of said side wall means and said second end of said bottom wall means.

16. A holder of claim 15, wherein said projecting means comprises strip angle means having adjoining vertically and horizontally disposable flange means, and said vertically disposable flange means has vertical slots to accomodate screws attaching said vertically disposable flange means to said side wall means.

17. A holder of claim 15, wherein said side wall means has recess means on the side opposed to said projecting means, one said recess means having conformation to receive arbour wrench means, another said recess means having conformation to receive rotary saw blade means.

18. A holder for a rotary power tool,
said tool including rotary disc shaped tool means and guard means for said tool means,
said holder comprising horizontally disposable bottom wall means, and vertically disposable side wall means,
said bottom wall means having opposed first and second ends, opposed first and second sides, and opposed upper and lower surfaces, including longitudinal slot means spaced apart from and parallel to said first side extending from said first end toward said second end, said bottom wall means having cylindrical aperture means separate from said slot means connecting said upper and lower surfaces,
said vertically disposable side wall means connected to and extending upward from said first side of said bottom wall means to an upper edge, said side wall means extending from said first end to said second end of said bottom wall means, said side wall means having inner and outer surfaces, said inner surface having continuous horizontally disposed inward projecting means space above said bottom wall means.

19. A holder of claim 18, wherein said projecting means comprises strip angle means having adjoining vertically and horizontally disposable flange means, and said vertically disposable flange means has vertical slots to accomodate screws attaching said vertically disposable flange means to said side wall means.

20. A holder of claim 18, wherein said side wall means has recess means on the side opposed to said projecting means, one said recess means having conformation to receive arbour wrench means, another said recess means having conformation to receive rotary saw blade means.

* * * * *